(12) United States Patent
Bansal et al.

(10) Patent No.: US 12,490,117 B2
(45) Date of Patent: Dec. 2, 2025

(54) ENHANCED MINIMIZATION OF DRIVE TEST (MDT) FRAMEWORK

(71) Applicant: QUALCOMM Incorporated, San Diego, CA (US)

(72) Inventors: Hargovind Prasad Bansal, Hyderabad (IN); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 17/921,603

(22) PCT Filed: Jun. 21, 2021

(86) PCT No.: PCT/US2021/038254
§ 371 (c)(1),
(2) Date: Oct. 26, 2022

(87) PCT Pub. No.: WO2022/005792
PCT Pub. Date: Jan. 6, 2022

(65) Prior Publication Data
US 2023/0171615 A1  Jun. 1, 2023

(30) Foreign Application Priority Data

Jun. 30, 2020 (IN) .............................. 202041027774

(51) Int. Cl.
*H04W 24/02* (2009.01)
*H04W 24/10* (2009.01)
(52) U.S. Cl.
CPC .......... *H04W 24/02* (2013.01); *H04W 24/10* (2013.01)
(58) Field of Classification Search
None
See application file for complete search history.

(56) References Cited

U.S. PATENT DOCUMENTS

2015/0208267 A1* 7/2015 Jung ..................... H04W 24/10
455/456.1

FOREIGN PATENT DOCUMENTS

CN 102752787 A 10/2012
CN 102783204 A 11/2012
(Continued)

OTHER PUBLICATIONS

Ericsson: "Leftover Issues for Logged MDT in NR", 3GPP Draft, R2-1915755, 3rd Generation Partnership Project (3GPP), Mobile Competence Centre, 650, Route Des Lucioles, F-06921 Sophia-Antipolis Cedex, France, vol. Ran WG2, No. Reno, US, Nov. 18, 2019-Nov. 22, 2019, Nov. 8, 2019 (Nov. 8, 2019), XP051817344, on Nov. 8, 2019] p. 2, p. 17.

(Continued)

*Primary Examiner* — Walter J Divito
(74) *Attorney, Agent, or Firm* — Seyfarth Shaw LLP

(57) ABSTRACT

A method performed by a user equipment (UE) includes receiving a logging measurement message having a logging measurement configuration from a base station. The method also initiates a minimization of drive test (MDT) session in response to receiving the logging measurement message. The method further determines a status of a UE component and selects a set of logged measurement types from a number of logged measurement types based on a measurement priority of each logged measurement type when the status satisfies status criteria. The method additionally generates an MDT log at each logging instance of a number of logging instances based on measurements collected for the set of logged measurement types when the status satisfies the status criteria. The method also transmits, to the base station, the MDT log of each logging instance after completing the MDT session.

27 Claims, 12 Drawing Sheets

(56) References Cited

FOREIGN PATENT DOCUMENTS

| CN | 103026750 | A  | 4/2013 |
|----|-----------|----|--------|
| EP | 2768254   | A1 | 8/2014 |
| EP | 2882219   | A2 | 6/2015 |

OTHER PUBLICATIONS

International Search Report and Written Opinion—PCT/US2021/038254—ISA/EPO—Nov. 23, 2021.
Partial International Search Report—PCT/US2021/038254—ISA/EPO—Oct. 1, 2021.
ZTE: "Enhancements for MDT UE Selection", 3GPP TSG RAN WG2 #72bis, 3GPP Draft, R2-110247, 3rd Generation Partnership Project (3GPP), Mobile Competence Centre, 650, Route Des Lucioles, F-06921 Sophia-Antipolis Cedex, France, vol. RAN WG2, No. Dublin, Ireland, Jan. 17, 2011-Jan. 21, 2011, Jan. 11, 2011 (Jan. 11, 2011), 2 Pages, KP050474677, [retrieved on Jan. 11, 2011] paragraph 2.
Ericsson: "Leftover Issues for Logged MDT in NR", 3GPP TSG-RAN WG2 #108, R2-1915755, (Revision of R2-1912827), Reno, US, Nov. 18-22, 2019, 23 Pages.
ZTE: "Enhancements for MDT UE Selection", 3GPP TSG RAN WG2 #72bis, R2-110247, Dublin, Ireland, Jan. 17-21, 2011, 2 pages.

\* cited by examiner

```
-- ASN1START

LoggedMeasurementConfiguration message

LoggedMeasurementConfiguration ::=    SEQUENCE {
    criticalExtensions                    CHOICE {
        c1                                    CHOICE {
            loggedMeasurementConfiguration-r10    LoggedMeasurementConfiguration-r10-IEs,
            spare3 NULL, spare2 NULL, spare1 NULL
        },
        criticalExtensionsFuture              SEQUENCE { }
    }
}

LoggedMeasurementConfiguration-r10-IEs ::= SEQUENCE {
    traceReference-r10                    TraceReference-r10,
    traceRecordingSessionRef-r10          OCTET STRING (SIZE (2)),
    tce-Id-r10                            OCTET STRING (SIZE (1)),
    absoluteTimeInfo-r10                  AbsoluteTimeInfo-r10,
    areaConfiguration-r10                 AreaConfiguration-r10                               OPTIONAL,    -- Need OR
    loggingDurarion-r10                   LoggingDuration-r10,
    loggingInterval-r10                   LoggingInterval-r10,
    nonCriticalExtension                  LoggedMeasurementConfiguration-v1080-IEs            OPTIONAL
}

LoggedMeasurementConfiguration-v1080-IEs ::= SEQUENCE {
    lateNonCriticalExtension              OCTET STRING                                        OPTIONAL,
    nonCriticalExtension                  LoggedMeasurementConfiguration-v1130-IEs            OPTIONAL
}

LoggedMeasurementConfiguration-v1130-IEs ::= SEQUENCE {
    plmn-IdentityList-r11                 PLMN-IdentityList3-r11                              OPTIONAL,    -- Need OR
    areaConfiguration-v1130               AreaConfiguration-v1130                             OPTIONAL,    -- Need OR
    nonCriticalExtension                  LoggedMeasurementConfiguration-v1250-IEs            OPTIONAL
}

LoggedMeasurementConfiguration-v1250-IEs ::= SEQUENCE {
    targetMBSFN-AreaList-r12              TargetMBSFN-AreaList-r12                            OPTIONAL,    -- Need OP
    nonCriticalExtension                  LoggedMeasurementConfiguration-v1530-IEs            OPTIONAL
}

LoggedMeasurementConfiguration-v1530-IEs ::= SEQUENCE {
    bt-NameList-r15                       BT-NameList-r15                                     OPTIONAL,    -- Need OR
    wlan-NameList-r15                     WLAN-NameList-r15                                   OPTIONAL,    -- Need OR
    nonCriticalExtension                  SEQUENCE { }                                        OPTIONAL
}

TargetMBSFN-AreaList-r12 ::=          SEQUENCE (SIZE (0..maxMBSFN-Area)) OF TargetMBSFN-Area-r12

TargetMBSFN-Area-r12 ::=              SEQUENCE {
    mbsfn-AreaId-r12                      MBSFN-AreaId-r12                                    OPTIONAL,    -- Need OR
    carrierFreq-r12                       ARFCN-ValueEUTRA-r9,
    ...
}

-- ASN1STOP
```

FIG. 4A

LogMeasResultListBT

The IE *LogMeasResultListBT* covers measured results for Bluetooth.

LogMeasResultListBT information element

```
-- ASN1START

LogMeasResultListBT-r15    ::=    SEQUENCE (SIZE (1..maxBT-IdReport-r15)) OF LogMeasResultBT-r15

LogMeasResultBT-r15 ::= SEQUENCE {
    bt-Addr-r15             BIT STRING (SIZE (48)),
    rssi-BT-r15             INTEGER (-128..127)              OPTIONAL,
    ...
}

-- ASN1STOP
```

| LogMeasResultListBT field descriptions |
|---|
| *bt-Addr* |
| This field indicates the Bluetooth public address of the Bluetooth beacon as defined in TS 36.355 [54]. |
| *rssi-BT* |
| This field provides the beacon received signal strength indicator (RSSI) in dBm as defined in TS 36.355 [54]. |

LogMeasResultListWLAN

The IE *LogMeasResultListWLAN* covers measured results for WLAN.

LogMeasResultListWLAN information element

```
-- ASN1START

LogMeasResultListWLAN-r15 ::=   SEQUENCE (SIZE (1..maxWLAN-Id-Report-r14)) OF LogMeasResultWLAN-r15

LogMeasResultWLAN-r15  ::=     SEQUENCE {
    wlan-Identifiers-r12       WLAN-Identifiers-r12,
    rssiWLAN-r15               WLAN-RSSI-Range-r13               OPTIONAL,
    rtt-WLAN-r15               WLAN-RTT-r15                      OPTIONAL,
    ...
}

-- ASN1STOP
```

*FIG. 4B*

```
LoggedMeasuremeacConfiguration-r10-IEs ::= SEQUENCE {
    traceReference-r10           TraceReference-r10,
    traceRecordingSessionRef-r10 OCTET STRING (SIZE (2)),
    tce-Id-r10                   OCTET STRING (SIZE (1)),
    absoluteTimeInfo-r10         AbsoluteTimeInfo-r10,
    areaConfiguration-r10        AreaConfiguration-r10              OPTIONAL,  -- Need OR
    loggingDuration-r10          LoggingDuration-r10,
    loggingInterval-r10          LoggingInterval-r10,
    nonCriticalExtension         LoggedMeasurementConfiguration-v1080-IEs  OPTIONAL
}

LoggedMeasurementConfiguration-v1080-IEs : := SEQUENCE {
    lateNonCriticalExtension-r10  OCTET STRING                               OPTIONAL,
    nonCriticalExtension          LoggedMeasurementConfigurarion-v1130-IEs  OPTIONAL
}

LoggedMeasurementConfiguration-v1130-IEs : := SEQUENCE {
    plmn-IdentityList-r11        PLMN-IdentityList3-r11             OPTIONAL,  -- Need OR
    areaConfiguration-v1130      AreaConfiguration-v1130            OPTIONAL,  -- Need OR
    nonCriticalExtension         LoggedMeasurementConfiguration-v1250-IEs  OPTIONAL
}

LoggedMeasuremeatConfiguration-v1250-IEs : := SEQUENCE {
    targetMBSFN-AreaList-r12     TargetMBSFN-AreaList-r12           OPTIONAL,  -- Need OP
    nonCriticalExtension         LoggedMeasurementConfiguration-v1530-IEs  OPTIONAL
}

LoggedMeasurementConfiguration-v1530-IEs : := SEQUENCE {
    bt-NameList-r15              BT-NameList-r15                    OPTIONAL,  -- Need OR
    wlan-NameList-r15            WLAN-NameList-r15                  OPTIONAL,  -- Need OR
    nonCriticalExtension         SEQUENCE {}                        OPTIONAL
}

LoggedMeasurementConfiguration-v17xx-IEs : := SEQUENCE {
    Mdt_measurement_PriorityList-r17    Mdt_measurement_PriorityList-r17  OPTIONAL,  --Need OR
    nonCriticalExtension                SEQUENCE {}                        OPTIONAL
}

Mdt_measurement_PriorityList-r17        SEQUENCE {
    Mdt_serving_Priority                mdt_meas_Prioroty ;
    MDT_Neigbor_Priority                mdt_meas_Prioroty ;
    MDT_Location_prioroty               mdt_meas_Prioroty ;
    MDT_MBSFN_meas_Priority             mdt_meas_Prioroty ;
    Mdt_wlan_meas_priority              mdt_meas_Prioroty ;
    Mdt_bt_meas_Priority                mdt_meas_Prioroty ;
}
|--ASN1START MdtMeasurement Priority  : :=           INTEGER (0..7)

--ASN1STOP
```

*FIG. 5*

```
LoggedMeasurementConfiguration-r10-IEs ::= SEQUENCE {
    traceReference-r10              TraceReference-r10,
    traceRecordingSessionRef-r10    OCTET STRING (SIZE (2)),
    tce-Id-r10                      OCTET STRING (SIZE (1)),
    absoluteTimeInfo-r10            AbsoluteTimeInfo-r10,
    areaConfiguration-r10           AreaConfiguration-r10                           OPTIONAL,    -- Need OR
    loggingDuration-r10             LoggingDuration-r10,
    loggingInterval-r10             LoggingInterval-r10,
    nonCriticalExtension            LoggedMeasurementConfiguration-v1080-IEs        OPTIONAL
}

LoggedMeasurementConfiguration-v1080-IEs ::= SEQUENCE {
    lateNonCriticalExtension-r10    OCTET STRING                                    OPTIONAL,
    nonCriticalExtension            LoggedMeasurementConfiguration-v1130-IEs        OPTIONAL
}

LoggedMeasurementConfiguration-v1130-IEs ::= SEQUENCE {
    plmn-IdentityList-r11           PLMN-IdentityList3-r11                          OPTIONAL,    -- Need OR
    areaConfiguration-v1130         AreaConfiguration-v1130                         OPTIONAL,    -- Need OR
    nonCriticalExtension            LoggedMeasurementConfiguration-v1250-IEs        OPTIONAL
}

LoggedMeasurementConfiguration-v1250-IEs ::= SEQUENCE {
    targetMBSFN-AreaList-r12        TargetMBSFN-AreaList-r12                        OPTIONAL,    -- Need OP
    nonCriticalExtension            LoggedMeasurementConfiguration-v1530-IEs        OPTIONAL
}

LoggedMeasurementConfiguration-v1530-IEs ::= SEQUENCE {
    bt-NameList-r15                 BT-NameList-r15                                 OPTIONAL,    --Need OR
    wlan-NameList-r15               WLAN-NameList-r15                               OPTIONAL,    --Need OR
    nonCriticalExtension            SEQUENCE {}                                     OPTIONAL
}

LoggedMeasurementConfiguration-v17xx-IEs ::= SEQUENCE {
    Mdt_measurement_Threshold-r17   Mdt_measurement_Threshold-r17                   OPTIONAL,    --Need OR
    nonCriticalExtension            SEQUENCE {}                                     OPTIONAL
}

Mdt_measurement_Threshold-r17   SEQUENCE {
Mdt_serving_Threshold               mdt_mess_Threshold_Index ;
MDT Neigbor Threshold               mdt_mess_Threshold_Index ;
MDT MBSFN meas threshold            mdt_meas_Threshold_Index ;
Mdt wlan meas threshold             mdt_meas_Threshold_Index ;
Mdt bt meas Threshold               mdt_meas_Threshold_Index ;
}

-- ASN1START mdt_meas_Threshold_Index::=     INTEGER(0..7)       // a Table can be defined in spec to map the index to actual measurement value for Cell, WLAN or BT

-- ASN1STOP
```

*FIG. 6*

ENHANCED MINIMIZATION OF DRIVE TEST (MDT) FRAMEWORK

CROSS REFERENCE TO RELATED APPLICATION

The present application claims priority under 35 U.S.C. § 119 to India Patent Application No. 202041027774 entitled "ENHANCED MINIMIZATION OF DRIVE TEST (MDT) FRAMEWORK," filed on Jun. 30, 2020, the disclosure of which is expressly incorporated by reference in its entirety.

FIELD OF THE DISCLOSURE

Aspects of the present disclosure generally relate to wireless communications, and more particularly to techniques and apparatuses for a minimization of drive test (MDT) framework.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method performed by a user equipment (UE) includes receiving, from a base station, a logging measurement message having a logging measurement configuration. The method also includes initiating a minimization of drive test (MDT) session in response to receiving the logging measurement message. The method further includes determining a status of a UE component. The method additionally includes selecting a set of logged measurement types from a number of logged measurement types based on a measurement priority of each logged measurement type when the status satisfies status criteria. The method further includes generating an MDT log at each of a number of logging instances based on measurements collected for the set of logged measurement types when the status satisfies the status criteria. The method still further includes transmitting, to the base station, the MDT log of each logging instance after completing the MDT session.

In other aspects of the present invention, a method performed by a user equipment (UE) includes receiving a logging measurement message having a logging measurement configuration from a base station. The method also includes initiating a minimization of drive test (MDT) session in response to receiving the logging measurement message. The method further includes generating an MDT log at each of a number of logging instances based on measurements collected for multiple logged measurement types configured by the logging measurement configuration. The method additionally includes filtering the MDT log of each logging instance to remove a logged measurement type based on a measurement threshold after completing the MDT session. The method still further includes transmitting, to the base station, the filtered MDT log of each logging instance.

In other aspects of the present disclosure, a method performed by a user equipment (UE) includes receiving, from a base station, a logging measurement message having a logging measurement configuration. The method also includes initiating a minimization of drive test (MDT) session in response to receiving the logging measurement message. The method further includes determining whether to perform measurements for a number of logged measurement types configured by the logging measurement configuration based on a mobility of the UE. The method further includes generating MDT logs based on measurements determined to be performed. The method still further includes transmitting, to the base station, the generated MDT logs.

In other aspects of the present disclosure, a method performed by a base station includes transmitting, to a user equipment (UE), a radio resource control (RRC) message having a logging measurement configuration including a minimization of drive test (MDT) measurement priority assigned to each of multiple measurement types. The method further includes receiving from the UE, an MDT log generated based on the logging measurement configuration.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 4A illustrates an example of a logged measurement configuration message.

FIG. 4B illustrates an example of a Bluetooth measurement information element and a wireless local area network measurement information element.

FIG. 5 illustrates an example of a logged measurement configuration including measurement priority information elements, in accordance with aspects of the present disclosure.

FIG. 6 illustrates an example of a logged measurement configuration including measurement threshold information elements, in accordance with aspects of the present disclosure.

DETAILED DESCRIPTION

Figure 1:
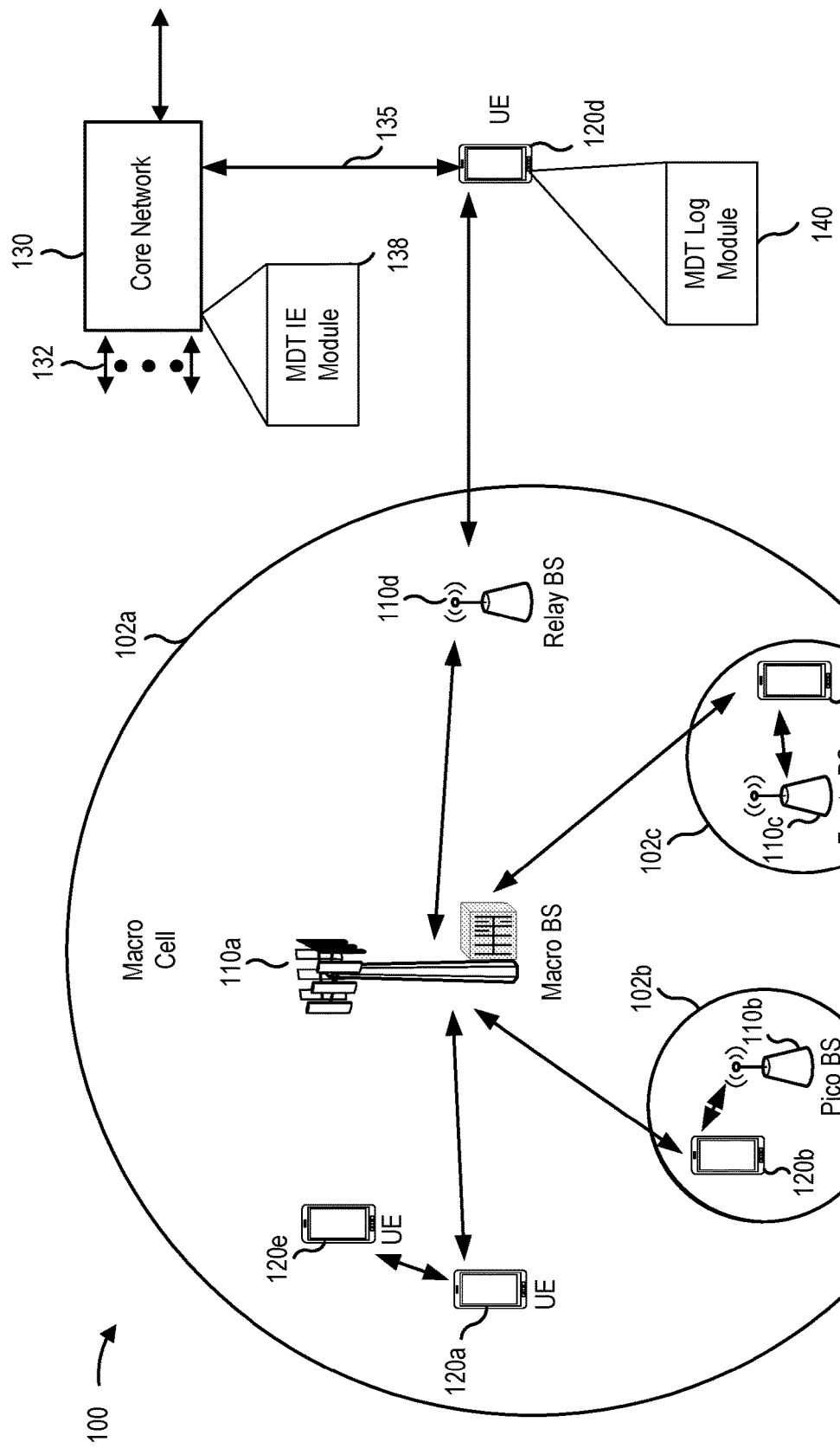
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A network expends resources when collecting data to improve network quality. A minimization of drive test (MDT) function may be specified to offload a portion of the data collection (e.g., radio measurement collections) to a user equipment (UE). A network may configure an MDT session and propagate the MDT session configuration via a control plane, such as with radio resource control (RRC) messaging. For example, a base station may transmit an MDT logging message including a logging measurement configuration to a UE. In response to receiving the MDT logging message, the UE may initiate an MDT session. During the MDT session, the UE generates an MDT log including information elements based on measurements configured in the logging measurement configuration. The measurements may be collected at each logging instance of a number of logging instances until completion of the MDT session. After completing the MDT session, the UE may transmit a report to the base station indicating successful collection of the MDT logs. The UE may then transmit the collected MDT logs, in response to receiving a request from the base station. The MDT session and the reporting of the MDT logs may be separately configured by the base station. Network coverage may be improved based on measurements provided in the MDT logs reported by the UE.

As network technologies advance, a size of the MDT logs increases. Still, an amount of data allocated for MDT log transmission may be limited. Therefore, MDT logs may be segmented and transmitted via multiple uplink messages. It is desirable to reduce a size of the MDT logs, thereby reducing segmentation and also reducing network overhead.

Additionally, measurement collection for MDT logs may increase resources, such as processer load, memory, and/or power, used by a UE. The increased resource use may increase a thermal level of the UE and/or reduce battery levels. It is desirable to decrease a number of resources used by the UE while collecting measurements for MDT logs.

Aspects of the present disclosure are directed to removing redundant information from MDT logs to reduce a size of the MDT logs while also reducing a number of resources used by the UE while collecting measurements for MDT logs.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130). The UEs 120 (e.g., 120a, 120b, 120c) may communicate with the core network 130 through a communications link 135.

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

The UEs 120 may include an MDT log module 140. For brevity, only one UE 120d is shown as including the MDT log module 140. The MDT log module 140 may be configured to perform one or more of the processes 700, 800, 900, 1000, 1100 described in FIGS. 7-11.

The core network 130 or the base stations 110 (not shown) may include an MDT information element (IE) module 138 configured to receive MDT logs from a UE 120. The MDT IE module 138 may identify missing information elements from MDT logs. If an information element is missing, the MDT IE module 138 may use a measurement value for the information element received in a previous MDT log.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB)).

As indicated above, FIG. 1 is provided merely as an example. Other examples may differ from what is described with regard to FIG. 1.

Figure 2:
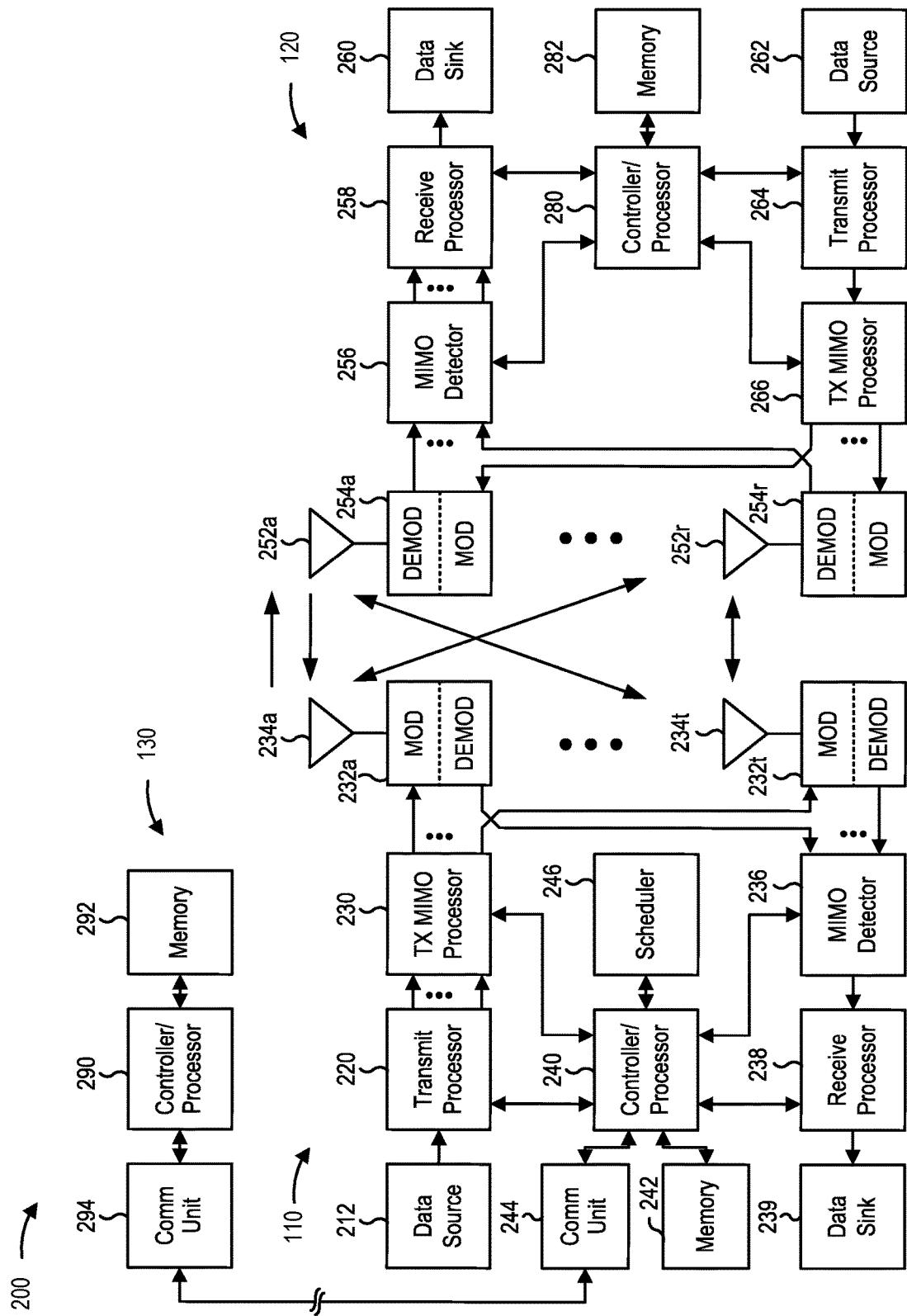
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with removing redundant information elements (e.g., logged measurement types) from MDT logs as described in more detail elsewhere. For example, the controller/processor 240 of the base station 110, the controller/processor 280 of the UE 120, and/or any other component(s) of FIG. 2 may perform or direct operations of, for example, the process of FIGS. 7-11 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for initiating, means for determining, means for selecting, means for generating, means for filtering, means for collecting, means for setting, means for bypassing, means for performing, means for obtaining, means for configuring, and/or means for transmitting. Such means may include one or more components of the UE 120, core network 130, or base station 110 described in connection with FIG. 2.

As indicated above, FIG. 2 is provided merely as an example. Other examples may differ from what is described with regard to FIG. 2.

A network expends resources, such as capital resources and operating resources, to collect data for network improvement. A minimization of drive test (MDT) function may be specified to offload a portion of the data collection (e.g., radio measurement collections) to a user equipment (UE). A network may configure an MDT session and propagate the MDT session configuration via a control plane, such as with radio resource control (RRC) messaging. For example, a base station may transmit an MDT logging message including a logging measurement configuration to a UE. In response to receiving the MDT logging message, the UE may initiate an MDT session.

During the MDT session, the UE generates an MDT log including information elements based on measurements configured in the logging measurement configuration. The measurements may be collected at each logging instance of a number of logging instances until completion of the MDT session. After completing the MDT session, the UE may transmit a report to the base station indicating successful collection of the MDT logs. The UE may then transmit the collected MDT logs, in response to receiving a request from the base station. The MDT session and the reporting of the MDT logs may be separately configured by the base station. Network coverage may be improved based on measurements provided in the MDT logs reported by the UE.

As network technologies advance, a size of the MDT logs increases. Still, an amount of data allocated for MDT log transmission may be limited. Therefore, MDT logs may be segmented and transmitted via multiple uplink messages. It is desirable to reduce a size of the MDT logs, thereby reducing segmentation and also reducing network overhead. Aspects of the present disclosure are directed to removing redundant information from MDT logs to reduce a size of the MDT logs.

Additionally, measurement collection for MDT logs may increase resources, such as processor load, memory, and/or power, consumed by a UE. The increased resource use may increase a thermal level of the UE and/or reduce battery levels. It is desirable to decrease a number of resources used by the UE while collecting measurements for MDT logs.

As described, a UE may be configured to perform measurements while in an idle state at each logging interval (e.g., point of time) of multiple logging intervals during an MDT session. The measurements for a logging interval may be collected and stored in a measurement log for reporting to the base station. For ease of explanation, the measurement log is referred to as an MDT log. The MDT log may also be referred to as a measurement report. The measurements may be referred to as MDT measurements. The MDT log may include one or more MDT measurements.

Figure 3:
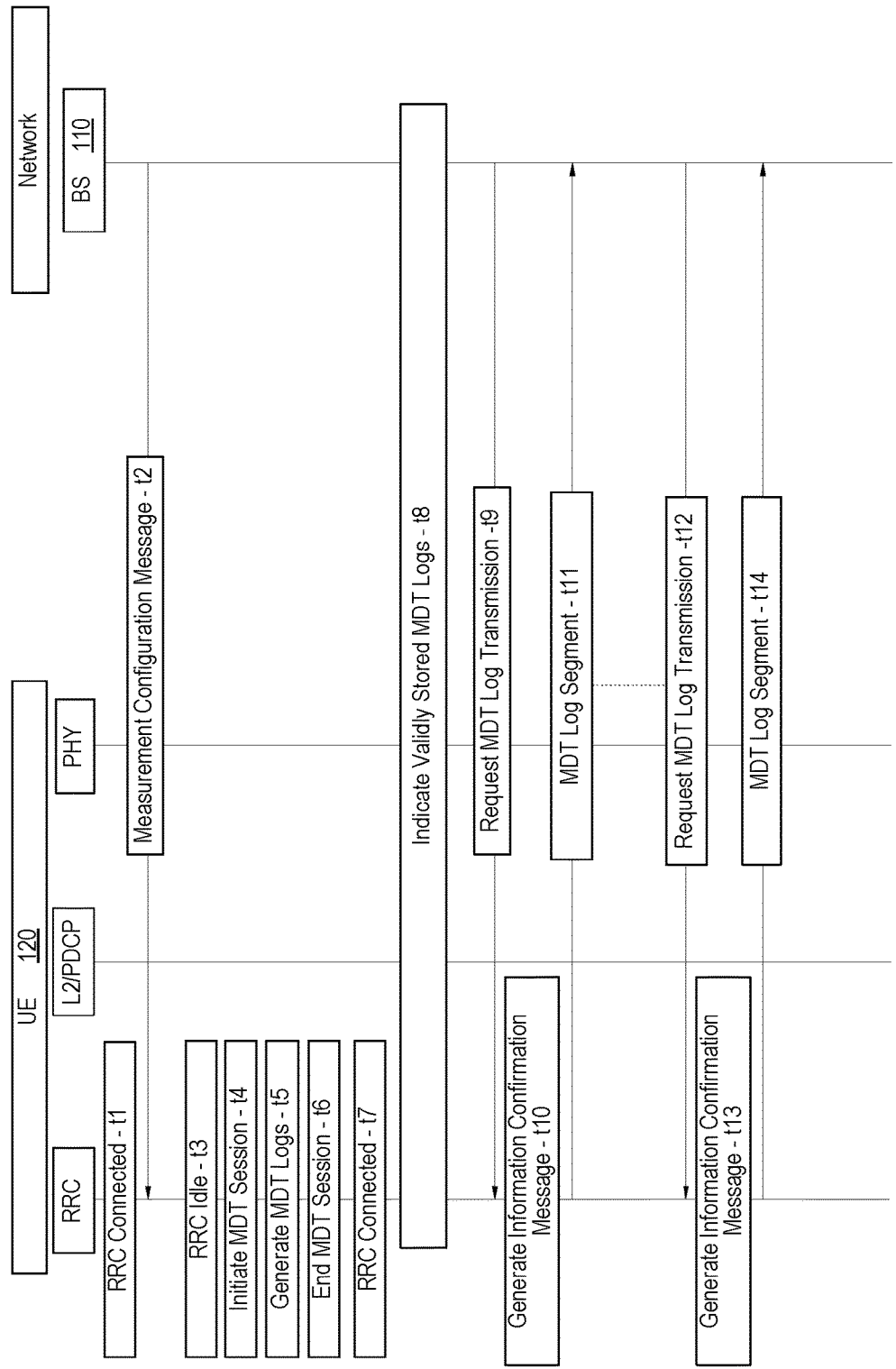
FIG. 3 is a timing diagram illustrating an example of a minimization of drive test (MDT) process.

FIG. 3 is a timing diagram 300 illustrating an example of an MDT process. As shown in FIG. 3, at time t1, a UE is in a radio resource control (RRC) connected mode. The UE may establish a user plane (UP) and control plane connection with the network when in the RRC connected mode. For ease of explanation, the network will be referred to as a base station (shown as BS in FIG. 3). The UE may be a UE 120 as described with reference to FIG. 1, and the base station may be a base station 110 as described with reference to FIG. 1.

In some cases, a base station 110 may obtain the UE capability information, including logged MDT support capability information, provided in an initial context setup request message transmitted by the mobility management entity (MME) (not shown in FIG. 3) during the initial context setup procedure. At time t2, the base station 110 transmits a measurement configuration message including a logging measurement configuration. The measurement configuration received at time t2 may be a LoggedMeasurementConfiguration information element. Additionally, the measurement configuration may configure the UE 120 to perform measurements for a number of measurement types included in the measurement configuration.

At time t3, the UE 120 enters an RRC idle state. Based on the measurement configuration received at time t2, the UE 120 initiates an MDT session at time t4. That is, the UE 120 initiates the MDT session after entering the RRC idle state. At time t5, the UE 120 generates an MDT log at each logging instance for the duration of the MDT session based on the MDT measurements collected at the logging instance. That is, at time t5, the UE 120 performs MDT measurements for one or more information elements configured by the measurement configuration received at time t2. The MDT logs may be generated at an RRC level of the UE 120. The logging instance and a duration of the MDT session may be configured by the base station 110.

As shown in FIG. 3, at time t6, the MDT session is completed and the UE 120 stores the MDT logs. The MDT logs may be stored for a time period, such as forty-eight hours. A size of each MDT log may vary. For example, in conventional systems, the size of an MDT log may be 64 KB or 3 MB.

At time t7, the UE 120 enters the RRC connected mode. Upon entering the RRC connected mode, the UE 120 transmits a message to the base station 110 indicating that it has validly stored the MDT logs (time t8). The indication may be provided via a log measurement available information element, such as logMeasAvailable. The information element may be provided in an RRC connection completion message, such as an RRCConnectionSetupComplete message transmitted during connection establishment, an RRCConnectionReconfigurationComplete message transmitted during a handover, or an RRCConnectionReestablishmentComplete message transmitted during a connection re-establishment.

In response to receiving the indication of validly stored MDT logs, the base station 110 transmits a request message requesting transmission of the MDT logs (time t9). At time t10, in response to receiving the request message, the UE 120 generates a UE information confirmation message including the collected MDT logs. The UE information confirmation message may be a type of RRC message.

The information confirmation message generated at time t10 may not include all of the collected MDT logs because lower layers of a network connection restrict a size of an RRC message. In some cases, the size is restricted to 8188 bytes. Based on the restriction, at time t10, the UE 120 segments the MDT logs (not shown in FIG. 3). For example, if an MDT log is 64 KB, the UE 120 may segment the MDT log into eight segments, where each segment is 8 KB. As described, MDT logs may vary in size. Therefore, the segments may be greater than or less than 8 KB. In the current example, at time t11, the UE 120 transmits one segment of one of the collected MDT logs. In response to receiving one segment of one of the collected MDT logs, at time t12, the base station 110 transmits a message requesting transmission of the MDT logs. At time t13, the UE 120 generates a second UE information confirmation message including a segment of one of the collected MDT logs. The segment is transmitted in the second UE information message at time t14. The process described for times t10-t14 may repeat until all of the MDT logs are transmitted.

In advanced LTE releases (such as Release 13 and beyond), the measurement configuration, such as the LoggedMeasurementConfiguration information element, may configure the UE to include wireless local area network (WLAN) measurements and/or Bluetooth™ (BT) information elements in the MDT logs. For example, the LoggedMeasurementConfiguration message may include a UE-BasedNetwPerfMeasParameters-v1530 information element defining optional measurement parameters for wireless local area networks (WLANs) and Bluetooth™ (BT), such as loggedMeasBT-r15, loggedMeasWLAN-r15, immMeasBT-r15, and immMeasWLAN-r15. As a result of the new measurement parameters, a size of the MDT logs has grown, thereby increasing a number of RRC message segments for each MDT log collected by the UE.

FIG. 4A illustrates an example of a LoggedMeasurementConfiguration message. As shown in FIG. 4A, the LoggedMeasurementConfiguration message may also include information elements (IEs) for WLAN and BT, such as bt-NameList-r15 and wlan-NameList-r15. As shown in FIG. 4A, the bt-NameList-r15 and wlan-NameList-r15 IEs are optional.

As described, the UE may obtain MDT measurements for information elements configured in the measurement configuration. FIG. 4B illustrates an example of a Bluetooth information element. As shown in FIG. 4B, the Bluetooth information element (shown as LogMeasResultListBT) provides Bluetooth measurements. The Bluetooth information element may provide a Bluetooth public address of a Bluetooth beacon (shown as bt-Addr-r15), and may also optionally provide a received signal strength indicator (RSSI) (shown as rssi-BT-r15).

FIG. 4B also illustrates an example of a WLAN information element. As shown in FIG. 4B, the WLAN information element (shown as LogMeasResultListWLAN-r15) provides WLAN measurements. The WLAN information element may provide WLAN identifiers (shown as wlan-Identifiers-r15), a received signal strength indicator (RSSI) (shown as rssiWLAN-r15), and a round trip time (RTT) (shown as rtt-WLAN-r15). The RSSI and RTT may be optional.

As described, to decrease network bandwidth and reduce a number of resources consumed by a UE (e.g., processing power, transmission resources, memory, etc.), it is desirable to reduce MDT log segmentation. Aspects of the present disclosure are directed to reducing a number of segments generated from segmenting RRC messages including MDT logs. In some implementations, the MDT logs include one or more information elements for MDT measurements, such as NR information elements, WLAN information elements, and/or BT information elements. Aspects of the present disclosure are not limited to MDT logs with NR information elements, WLAN information elements, and/or BT information elements. Other information elements may be included as an addition, or an alternate, to the NR information elements, WLAN information elements, and/or BT information elements. The information elements for the MDT measurements may be requested by a manufacturer (e.g., original equipment manufacturer (OEM)) and/or a network operator.

As described, current 3GPP Standards releases, such as Release 15, do not specify techniques for reducing MDT log segmentation. In some configurations, segmentation is reduced by filtering (e.g., removing) redundant information elements from one or more MDT logs. In some examples, the redundant information elements may include, for example, a serving cell identifier (ID) (e.g., identity), a neighbor cell ID, a carrier frequency, an inter-radio access technology (IRAT) ID, a WLAN ID, and/or a BT ID.

Additionally, MDT measurement collection may result in increased thermal levels, decreased battery levels, and/or other undesirable conditions at a UE. In conventional systems, a UE may stop performing MDT measurements based on a status of a UE component, for example, when a battery level is less than a threshold.

According to aspects of the present disclosure, a measurement priority is specified for each logged measurement type. For example, a measurement priority may be added to logged measurement types, such as serving cell measurements, neighbor cell measurements, multimedia broadcast multicast service over single frequency network (MBSFN) measurements, WLAN measurements, BT measurements, location measurements, and/or other measurements. Aspects of the present disclosure are not limited to the measurement types described above. Other measurement types, such as future measurement types, are also contemplated. The measurement priority may be included as an information element, such as MDT measurement priority. The measurement priority information element may be added to each measurement type in the logged measurement configuration message transmitted from the base station.

A UE may reduce a scope of the MDT measurement collection based on the measurement priority. For example, if a UE is operating in a limited power mode (e.g., a battery level is less than a threshold), the UE may collect a limited number of MDT measurements. In some examples, the UE collects MDT measurements for logged measurement types assigned with a highest measurement priority. In other examples, the UE may perform measurements for measurement types corresponding to the top X measurement priorities, where X may be implementation specific. For example, a value for X may be adjusted based on the battery level or battery condition.

As described, the MDT log may include a limited number of MDT measurements based on the measurement priority and a status of a UE component, such as a battery level, a thermal status of a processor, and/or a status of another component. The status is not limited to a battery level or a thermal condition. Other conditions are contemplated. The status may be configured based on an OEM and/or network operator configuration.

FIG. 5 illustrates an example of a logged measurement configuration (shown as LoggedMeasurementConfiguration-r10-IEs) including measurement priority information elements, in accordance with aspects of the present disclosure. As shown in FIG. 5, a measurement priority information element (shown as mdt_meas_Priority) may be added to logged measurement types, such as a serving cell measurement, a neighbor cell measurement, a location measurement, an MBSFN measurement, a WLAN measurement, and/or a BT measurement. The measurement priority information element may associate a priority value, such as an integer between zero and seven, to each measurement type. In some configurations, the measurement priority information element is optional.

In some implementations, the measurement priority is configured by an original equipment manufacturer (OEM) and/or a network operator via an encrypted file system (EFS) method. For example, the OEM may configure the measurement priority via over-the-air updates.

As described, a network may improve coverage based on MDT logs received from a UE. Network coverage information in the MDT logs may identify locations experiencing cell power that is less than a power threshold, locations experiencing coverage that is less than a coverage threshold, and/or locations experiencing interference that is greater than an interference threshold. Accordingly, measurements identifying locations experiencing cell power that is greater than a power threshold, locations experiencing coverage that is greater than a coverage threshold, and/or locations experiencing interference that is less than an interference threshold may not be useful to the network.

In some configurations, MDT logs are filtered to exclude (e.g., remove) measurement types that are above a measurement threshold at each logging instance. That is, if measurement results are above a threshold, the measurement type may not provide value for the MDT report. Each logged measurement type may have a defined threshold. For example, the MDT log of each logging instance may be filtered to remove measurement types that may not be useful for improving network coverage. The MDT logs may be filtered after an MDT session is complete. The network may configure the threshold values to receive reports based on the threshold criteria.

As an example, the MDT logs may be filtered to remove signal strength measurement types (e.g., reference signal received power (RSRP) measurements or reference signal received quality (RSRQ) measurements) that are greater than a signal strength threshold. In this example, the received signal strength may be measured for a serving cell, WLAN, and/or a neighbor cell. The filtered MDT logs may include signal strength measurement types for cells with a received signal power that is less than the signal strength threshold. In some configurations, if the measurements for all measurement types are above the corresponding thresholds, the signal strength measurement types are excluded. The thresholds are not limited to signal strength measurement types, other measurement types, such as interference, are considered.

As described, the MDT logs may be filtered to remove signal strength or signal quality measurement types for a serving cell and/or other measurement types that are greater than a defined threshold. The measurement types may be defined for a serving cell, neighbor cell, WLAN, BT, and/or MBSFN, for example.

As described, the UE may only report information elements for cells below a signal power threshold to reduce a size of an MDT log. Reducing the size of the MDT log may also improve UE power savings. Aspects of the present disclosure are not limited to filtering information elements based only on signal power threshold. Other measurement thresholds may be specified.

In some configurations, a measurement threshold information element, such as an MDT measurement threshold, may be added to each measurement type in the logged measurement configuration. The measurement types may include, for example, serving cell, neighbor cell, WLAN, BT, and/or MBSFN. FIG. 6 illustrates an example of a logged measurement configuration (shown as LoggedMeasurementConfiguration-r10-IEs) including measurement threshold information elements, in accordance with aspects of the present disclosure. As shown in FIG. 6, a measurement threshold information element (shown as mdt_meas_Threshold_Index) may be added to different measurement type information elements, such as Mdt_serving_Threshold, MDT_Neighbor_Threshold, MDT_MB_SFN_meas_threshold, Mdt_wlan_meas_threshold, and Mdt_bt_meas_Threshold. Each measurement threshold information element may be assigned a threshold value, such as an integer between zero and seven, based on an index (shown as mdt_meas_Threshold_Index). A table may associate measurement values to the index.

Additionally, or alternatively, the measurement threshold may be configured by an OEM and/or a network operator via an encrypted file system (EFS) method. For example, the OEM may configure the measurement priority via over-the-air updates.

Other inputs from the UE, such as battery power, thermal condition, and/or other inputs may be considered when determining whether to transmit an MDT log. In some configurations, measurements are performed based on a measurement priority of the logged measurement types. Furthermore, the information elements in the MDT logs are filtered based on a measurement threshold. For example, based on a status of a UE component (e.g., battery level), the MDT measurements may be performed based on an assigned measurement priority of the logged measurement types. At each logging interval, the performed MDT measurements may be collected in an MDT log. After an MDT session, the MDT logs may be filtered to remove information elements based on one or more thresholds. For example, signal strength measurements greater than the signal strength threshold may be removed from MDT logs.

As described, MDT measurements may improve network coverage. Over a period of logging instances, MDT measurements from stationary UEs may be redundant. That is, one or more MDT measurements may be the same while the UE is stationary. Therefore, the MDT measurements may fail to improve network coverage.

In some configurations, a sensor of a UE, such as a location sensor (e.g., global positioning system (GPS) sensor), determines if the UE is stationary. A UE may be stationary if a distance traveled over a motion status evaluation period is less than a distance threshold. Alternatively, the sensor may determine that the UE is mobile. One or more information elements may be removed from one or more MDT logs when the UE is stationary.

In some configurations, the UE's mobility may be determined at each motion status evaluation period of a number of motion status evaluation periods. The motion status evaluation periods may be specified during the MDT session. As an example, at a current motion status evaluation period (e.g., first motion status evaluation period), based on location sensor information (e.g., global positioning system (GPS) information), an MDT log module, such as the MDT log module 140 described for FIG. 1, determines whether the UE is stationary or mobile.

In one example, if the UE is stationary, the MDT log module schedules a subsequent motion status evaluation period (e.g., second motion status evaluation period). The time period between the current motion status evaluation period and the subsequent motion status evaluation period may be a first number of logging instances. The MDT log module may collect MDT measurements (e.g., generate MDT logs) during the first number of logging instances. At the subsequent motion status evaluation period, the MDT log module determines whether the UE is mobile or stationary.

If the UE is stationary at the subsequent motion status evaluation period (e.g., a second motion status evaluation period), the MDT log module schedules another subsequent motion status evaluation period (e.g., a third motion status evaluation period). In this example, the time period between the second motion status evaluation period and the third motion status evaluation period may be a second number of logging instances. The first number of logging instances is less than or equal to the second number of logging instances. The MDT log module does not collect MDT measurements during the second number of logging instances. The process described above for the first motion status evaluation period is repeated at the time period of the third motion status evaluation period.

Alternatively, if the UE is mobile at the subsequent motion status evaluation period (e.g., the second motion status evaluation period), the MDT log module schedules another subsequent motion status evaluation period (e.g., a fourth motion status evaluation period). The motion status evaluation period may be implementation specific. The time period between evaluation periods may also be implementation specific. In this example, the time period between the second motion status evaluation period and the fourth motion status evaluation period may be the first number of logging instances. As described, the MDT log may collect measurements during the first number of logging instances. The process described above for the first motion status evaluation period is repeated at the time period of the third motion status evaluation period.

As another example, if the UE is mobile at the first motion status evaluation period, the MDT log module schedules a subsequent motion status evaluation period. In this example, the time period between the first motion status evaluation period and the subsequent motion status evaluation period is the first number of logging instances. As described, the MDT log may collect measurements during the first number of logging instances. The process described above for the first motion status evaluation period repeats at the time period of the subsequent motion status evaluation period.

As indicated above, FIGS. 3-6 are provided as examples. Other examples may differ from what is described with respect to FIGS. 3-6.

Figure 7:
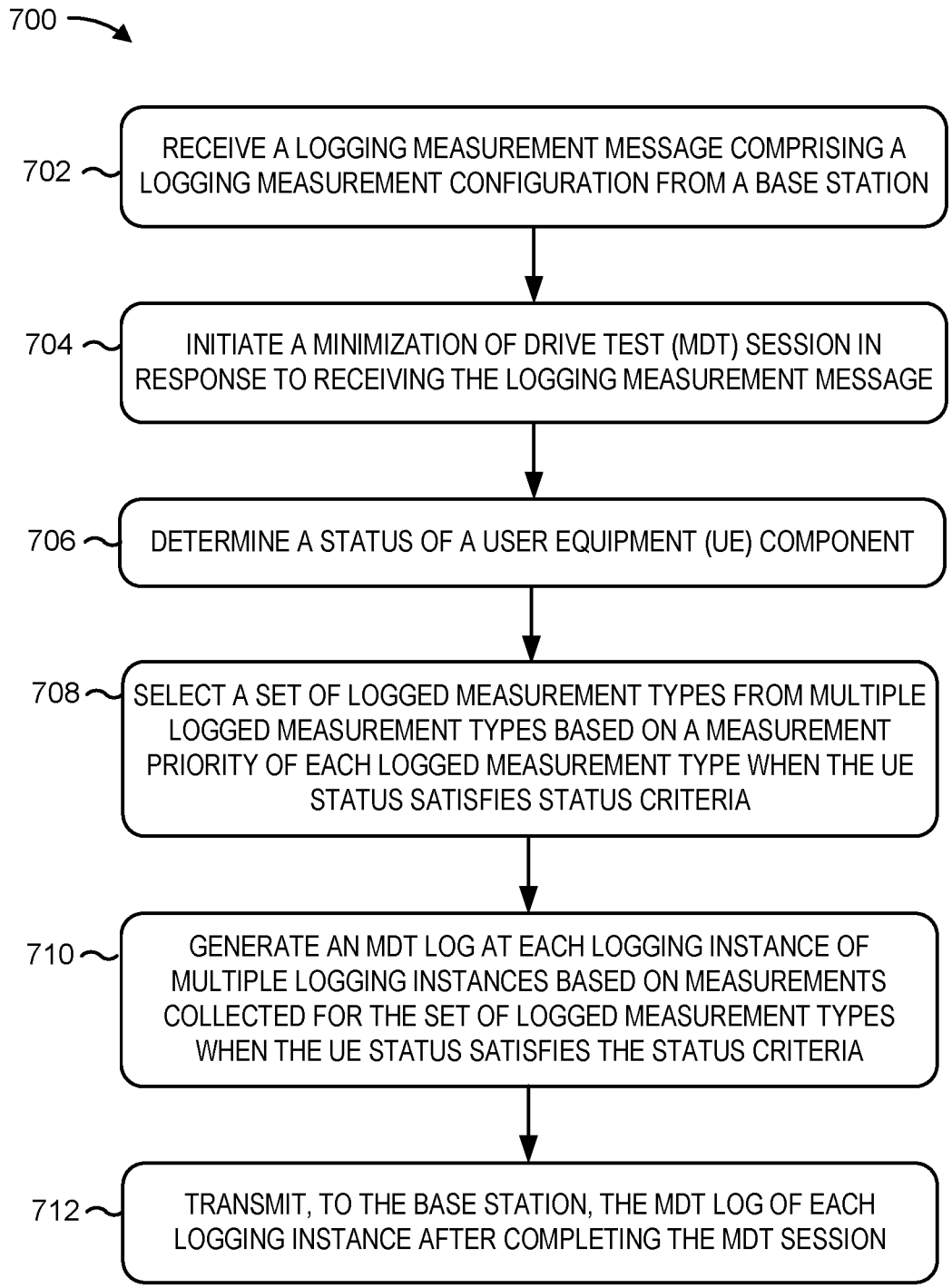
FIGS. 7, 8, 9, 10, and 11 are flow diagrams illustrating example processes performed, for example, by a user equipment, in accordance with various aspects of the present disclosure.

FIG. 7 is a flow diagram illustrating an example process 700 performed, for example, by a UE, in accordance with various aspects of the present disclosure. The example process 700 is an example of reducing redundant measurement types from MDT logs.

As shown in FIG. 7, at block 702, the process 700 receives a logging measurement message comprising a logging measurement configuration from a base station. The measurement configuration may configure the UE to perform measurements for a number of measurement types included in the measurement configuration. Additionally, at block 704, the process 700 initiates a minimization of drive test (MDT) session in response to receiving the logging measurement message.

At block 706, the process 700 determines a status of a UE component. For example, the process may determine a status of a battery and the status may be a battery level. In other examples, the process may determine a status of a processor and the status may be a thermal level.

Furthermore, at block 708, the process 700 selects a set of logged measurement types from multiple logged measurement types based on a measurement priority of each logged measurement type when the UE status satisfies status criteria.

Additionally, at block 710, the process 700 generates an MDT log at each logging instance of multiple logging instances based on measurements collected for the set of logged measurement types when the UE status satisfies the status criteria. In some cases, the method may satisfy the status criteria when the battery level is less than a threshold. In other examples, the process may satisfy the status criteria when the thermal level is greater than a threshold. The UE may collect, at each logging instance, measurements for the set of logged measurement types from the logged measurement types. The logged measurement types may include serving cell measurements, neighbor cell measurements, wireless local area network (WLAN) measurements, Bluetooth measurements, location measurements, multimedia broadcast multicast service single frequency network (MBSFN) measurements, and/or implementation specific measurements. In some aspects, the UE receives a message from an original equipment manufacturer or a network operator indicating the measurement priority for each of the logged measurement types. In other aspects, the UE determines the measurement priority for each of the logged measurement types from the logging measurement configuration.

Finally, at block 712, the process 700 transmits, to the base station, the MDT log of each logging instance after completing the MDT session. The transmitted MDT log is smaller than it would be without the priorities due to the reduction of redundant measurement types.

Figure 8:
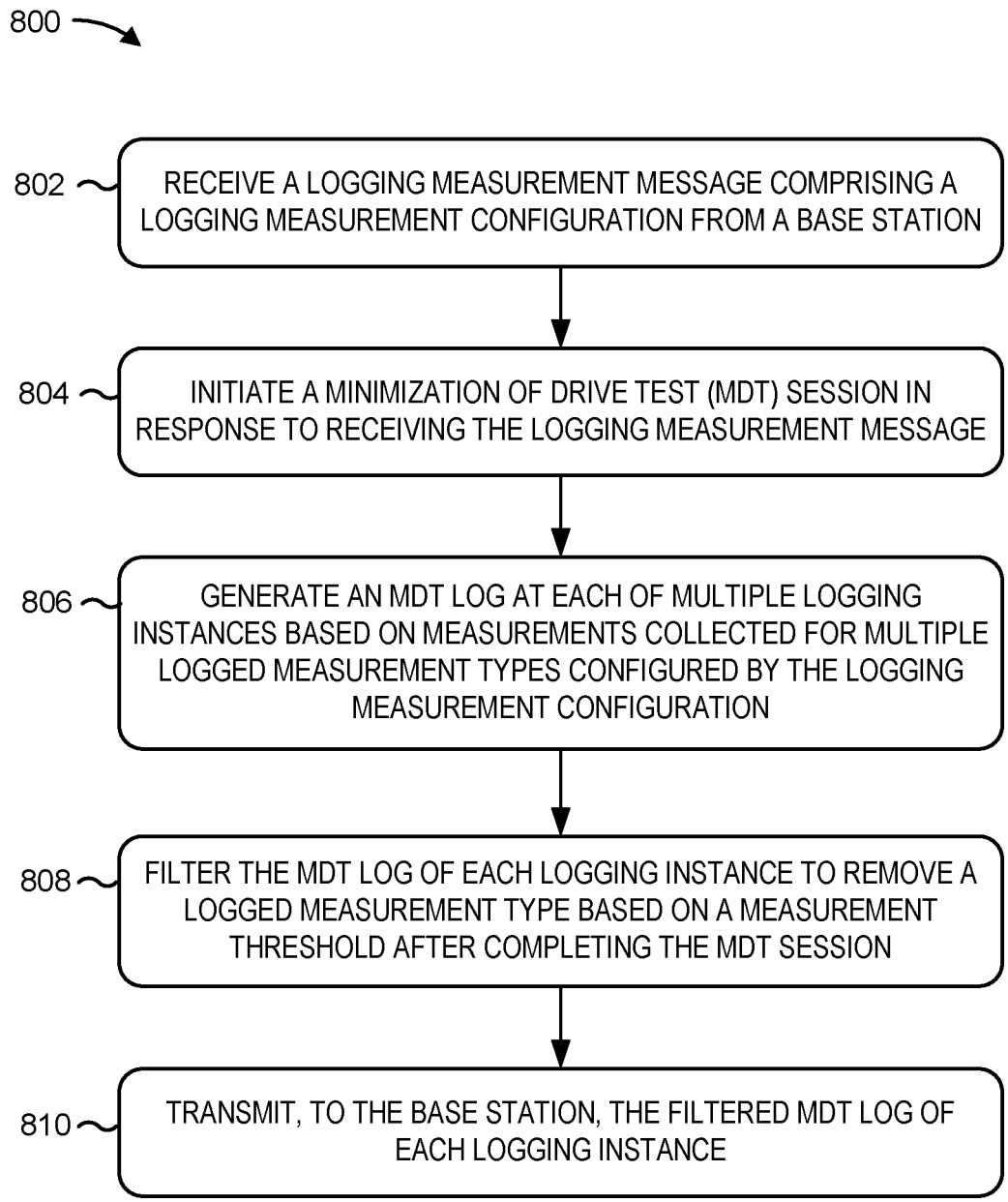

FIG. 8 is a flow diagram illustrating an example process 800 performed, for example, by a UE, in accordance with various aspects of the present disclosure. The example process 800 is an example of reducing redundant measurement types from MDT logs.

As shown in FIG. 8, at block 802, the process 800 receives a logging measurement message comprising a logging measurement configuration from a base station. The measurement configuration may configure the UE to perform measurements for a number of measurement types included in the measurement configuration. Additionally, at block 804, the process 800 initiates a minimization of drive test (MDT) session in response to receiving the logging measurement message.

At block 806, the process 800 generates an MDT log at each of multiple logging instances based on measurements collected for logged measurement types configured by the logging measurement configuration. The UE may collect, at each logging instance, measurements for the set of logged measurement types from the logged measurement types. The logged measurement types may include serving cell measurements, neighbor cell measurements, wireless local area network (WLAN) measurements, Bluetooth measurements, location measurements, multimedia broadcast multicast service single frequency network (MBSFN) measurements, and/or implementation specific measurements.

Furthermore, at block 808, the process 800 filters the MDT log of each logging instance to remove a logged measurement type based on a measurement threshold after completing the MDT session. The filtering may remove transmit power measurements greater than the transmit power threshold, for example. In some aspects, the UE may determine the measurement threshold from the logging measurement configuration. In other aspects, the UE may receive a message from a network operator or an original equipment manufacturer (OEM) indicating the measurement threshold.

Finally, at block 810, the process 800 transmits, to the base station, the filtered MDT log of each logging instance. The transmitted MDT log is smaller than it would be without the filtering due to the reduction of redundant measurement types.

Figure 9:
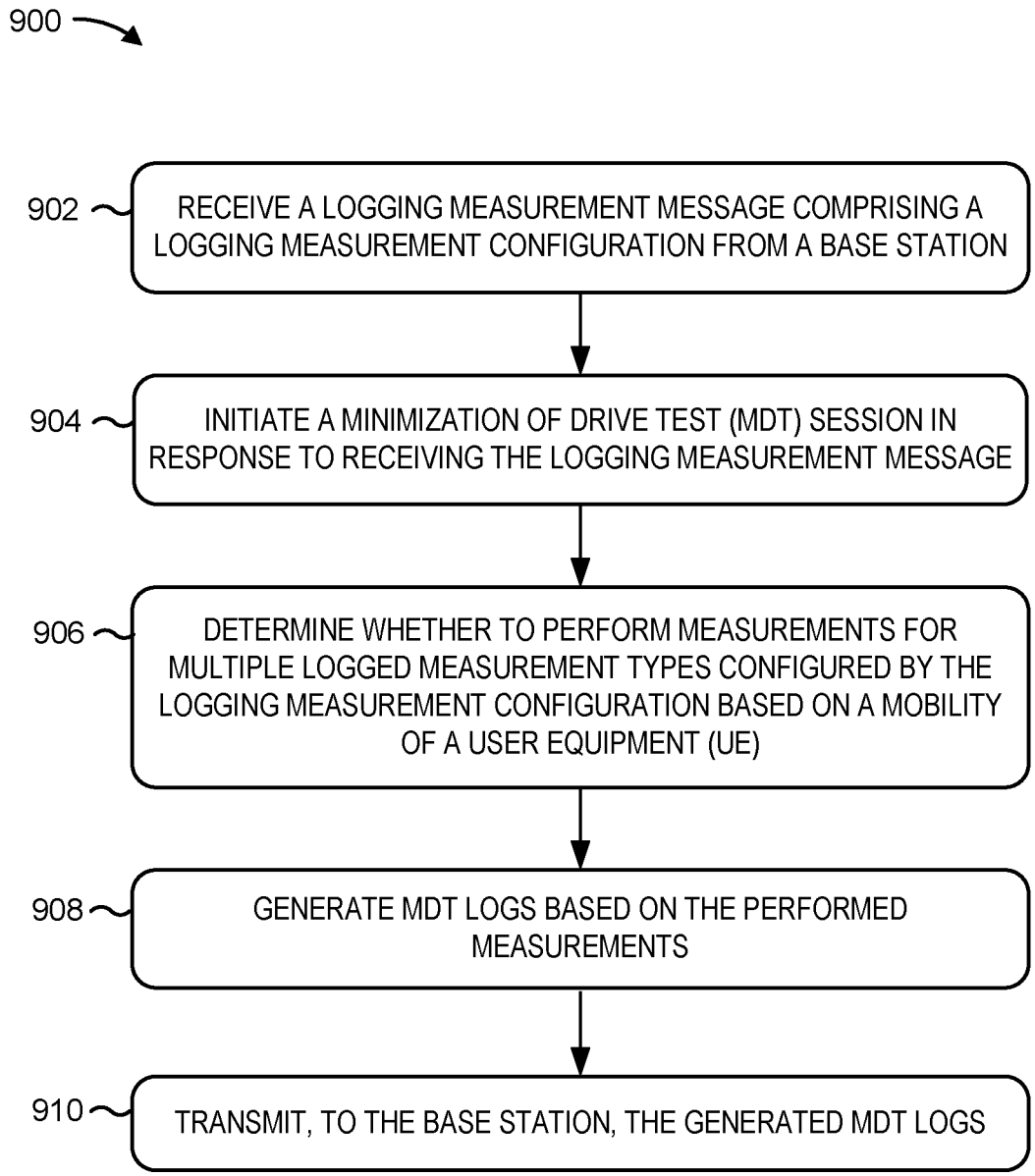

FIG. 9 is a flow diagram illustrating an example process 900 performed, for example, by a UE, in accordance with various aspects of the present disclosure. The example process 900 is an example of reducing redundant measurement types from MDT logs.

As shown in FIG. 9, at block 902, the process 900 receives a logging measurement message comprising a logging measurement configuration from a base station. The measurement configuration may configure the UE to perform measurements for a number of measurement types included in the measurement configuration. At block 904, the process 900 initiates a minimization of drive test (MDT) session in response to receiving the logging measurement message.

Furthermore, at block 906, the process 900 determines whether to perform measurements for multiple logged measurement types configured by the logging measurement configuration based on a mobility of the UE. In some configurations, a sensor of a UE, such as a location sensor (e.g., global positioning system (GPS) sensor), determines if the UE is stationary. A UE may be stationary if a distance traveled over a motion status evaluation period is less than a distance threshold. Alternatively, the sensor may determine that the UE is mobile.

Furthermore, at block 908, the process 900 generates MDT logs based on the performed measurements. One or more information elements may be removed from one or more MDT logs when the UE is stationary. Finally, at block 910, the process 900 transmits, to the base station, the generated MDT logs. The transmitted MDT log is smaller than it would be without the mobility determination due to the reduction of redundant measurement types.

Figure 10:
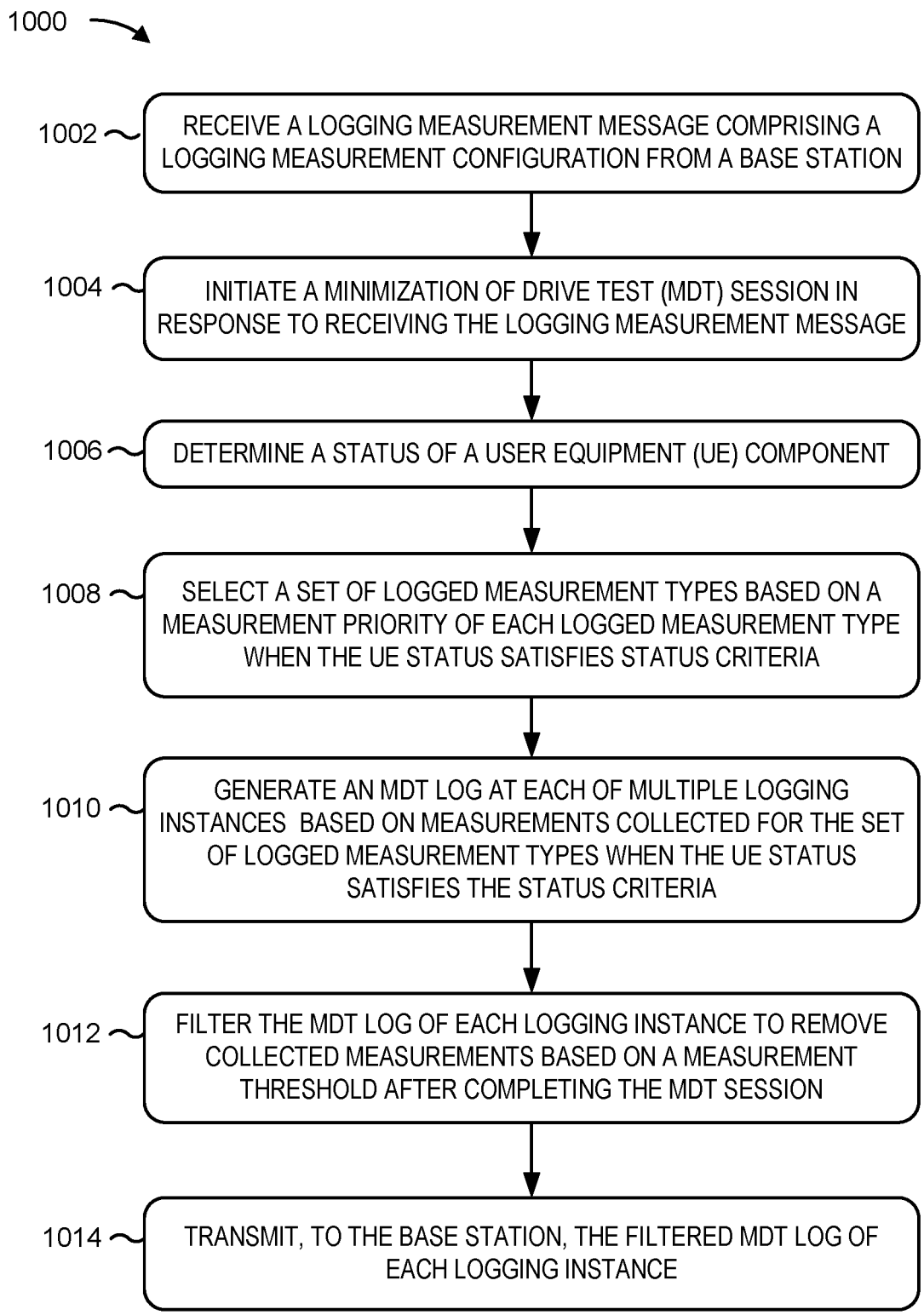

FIG. 10 is a flow diagram illustrating an example process 1000 performed, for example, by a UE, in accordance with various aspects of the present disclosure. The example process 1000 is an example of reducing redundant measurement types from MDT logs.

As shown in FIG. 10, at block 1002, the process 1000 receives a logging measurement message comprising a logging measurement configuration from a base station. The measurement configuration may configure the UE to perform measurements for a number of measurement types included in the measurement configuration. Furthermore, at block 1004, the process 1000 initiates a minimization of drive test (MDT) session in response to receiving the logging measurement message.

Additionally, at block 1006, the process 1000 determines a status of a UE component. For example, the process may determine a status of a battery and the status may be a battery level. In other examples, the process may determine a status of a processor and the status may be a thermal level.

Furthermore, at block 1008, the process 1000 selects a set of logged measurement types based on a measurement priority of each logged measurement type when the UE status satisfies status criteria. Furthermore, at block 1010, the process 1000 generates an MDT log at each of multiple logging instances based on measurements collected for the set of logged measurement types when the UE status satisfies the status criteria. In some cases, the method may satisfy the status criteria when the battery level is less than a threshold. In other cases, the process may satisfy the status criteria when the thermal level is greater than a threshold.

Also, at block 1012, the process 1000 filters the MDT log of each logging instance to remove collected measurements based on a measurement threshold after completing the MDT session. The filtering may remove transmit power measurements greater than the transmit power threshold, for example. Finally, at block 1014, the process 1000 transmits, to the base station, the filtered MDT log of each logging instance. The transmitted MDT log is smaller than it would be without the filtering due to the reduction of redundant measurement types.

Figure 11:
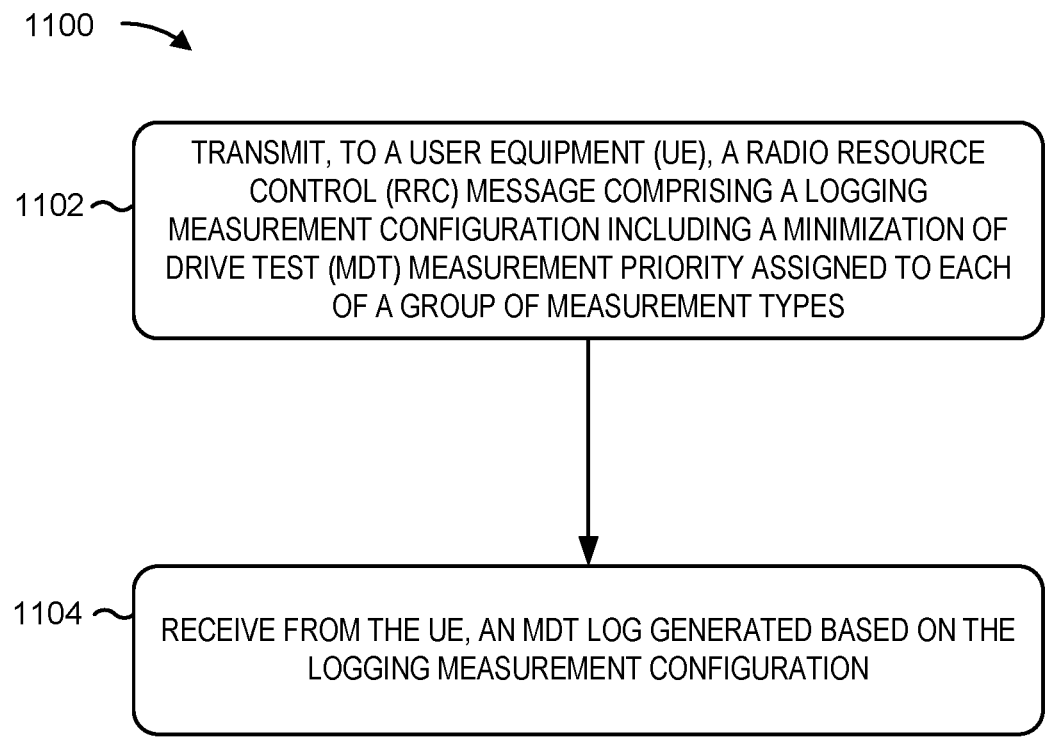

FIG. 11 is a flow diagram illustrating an example process 1100 performed, for example, by a by a base station, in accordance with various aspects of the present disclosure. The example process 1100 is an example of reducing redundant measurement types from MDT logs.

As shown in FIG. 11, at block 1102, the process 1100 transmits, to a user equipment (UE), a radio resource control (RRC) message comprising a logging measurement configuration including a minimization of drive test (MDT) measurement priority assigned to each of a group of measurement types. The MDT measurement priority may be indicated in an additional information element. The measurement types include a serving cell measurement type, a neighbor cell measurement type, a location measurement type, an multimedia broadcast multicast service over single frequency network (MBSFN) measurement type, a wireless local area network (WLAN) measurement type, and/or a Bluetooth measurement type. In some aspects, the MDT measurement priority is an integer. The MDT log may include a subset of the measurement types configured in the logging measurement configuration. At block 1104, the process 1100 receives from the UE, an MDT log generated based on the logging measurement configuration.

The processes 700, 800, 900, 1000, and 1100 described above may be performed by one or more components of a UE, such as the UE 120 of FIG. 1. For example, the processes 700, 800, 900, 1000, and 1100 may be performed by one or more of the antenna 252*a*, antenna 252*r*, DEMOD/MOD 254*a*, DEMOD/MOD 254*r*, MIMO detector 256, TX MIMO processor 266, receive processor 258, transmit processor 264, controller processor 280, and/or memory 282 of the UE.

Implementation examples are described in the following numbered clauses.

1. A method performed by a user equipment (UE), comprising:
   receiving a logging measurement message comprising a logging measurement configuration from a base station;
   initiating a minimization of drive test (MDT) session in response to receiving the logging measurement message;
   determining a status of a UE component;
   selecting a set of logged measurement types from a plurality of logged measurement types based on a measurement priority of each logged measurement type when the status satisfies status criteria;
generating an MDT log at each logging instance of a plurality of logging instances based on measurements collected for the set of logged measurement types when the status satisfies the status criteria; and
transmitting, to the base station, the MDT log of each logging instance after completing the MDT session.

2. The method of clause 1, further comprising collecting, at each logging instance, measurements for the set of logged measurement types from the plurality of logged measurement types, in which the plurality of logged measurement types comprise serving cell measurements, neighbor cell measurements, wireless local area network (WLAN) measurements, Bluetooth measurements, location measurements, multimedia broadcast multicast service single frequency network (MBSFN) measurements, and/or implementation specific measurements.

3. The method of clause 1 or 2, in which the measurement priority of each logged measurement type in the set of logged measurement types satisfies a priority criteria.

4. The method of any of the preceding clauses, further comprising setting the priority criteria as a range of highest priority values.

5. The method of any of the preceding clauses, in which the range is based on the status.

6. The method of any of the preceding clauses, in which the UE component comprises a battery and the status comprises a battery level, and the method further comprises satisfying the status criteria when the battery level is less than a threshold.

7. The method of any of the preceding clauses, in which the UE component comprises a processor and the status comprises a thermal level, and the method further comprises satisfying the status criteria when the thermal level is greater than a threshold.

8. The method of any of the preceding clauses, further comprising receiving a message from an original equipment manufacturer or a network operator indicating the measurement priority for each logged measurement type of the plurality of logged measurement types.

9. The method of any of the preceding clauses, further comprising determining the measurement priority for each logged measurement type of the plurality of logged measurement types from the logging measurement configuration.

10. The method of any of the preceding clauses, in which the status comprises a configuration provided by an original equipment manufacturer (OEM) or a network operator.

11. The method of any of the preceding clauses, in which the plurality of logged measurement types are a subset of logged measurement types configured in the logging measurement configuration.

12. The method of any of the preceding clauses, further comprising:
filtering the MDT log of each logging instance to remove collected measurements based on a measurement threshold after completing the MDT session; and
transmitting, to the base station, the filtered MDT log of each logging instance.

13. A method performed by a user equipment (UE), comprising:
receiving a logging measurement message comprising a logging measurement configuration from a base station;
initiating a minimization of drive test (MDT) session in response to receiving the logging measurement message;
generating an MDT log at each logging instance of a plurality of logging instances based on measurements collected for a plurality of logged measurement types configured by the logging measurement configuration;
filtering the MDT log of each logging instance to remove a logged measurement type based on a measurement threshold after completing the MDT session; and
transmitting, to the base station, the filtered MDT log of each logging instance.

14. The method of clause 13, in which the logged measurement type comprises a signal strength measurement of at least one of a serving cell, a neighbor cell, an inter-radio access technology (IRAT) cell, a multimedia broadcast multicast service over single frequency network (MBSFN) cell, a wireless local area network (WLAN) cell, a Bluetooth cell, or a combination thereof, and the measurement threshold comprises a signal strength/signal quality measurement threshold.

15. The method of clause 13 or 14, in which the filtering comprises removing transmit power measurements greater than a transmit power threshold.

16. The method of any of the clauses 13-15, further comprising determining the measurement threshold from the logging measurement configuration.

17. The method of any of the clauses 13-16, further comprising receiving a message from a network operator or an original equipment manufacturer (OEM) indicating the measurement threshold.

18. A method performed by a user equipment (UE), comprising:
receiving a logging measurement message comprising a logging measurement configuration from a base station;
initiating a minimization of drive test (MDT) session in response to receiving the logging measurement message;
determining whether to perform measurements for a plurality of logged measurement types configured by the logging measurement configuration based on a mobility of the UE;
generating MDT logs based on measurements determined to be performed; and
transmitting, to the base station, the generated MDT logs.

19. The method of clause 18, in which determining whether to perform the measurements comprises:
determining the UE is stationary at a first time period during the MDT session;
determining whether the UE is stationary at a second time period, a time difference between the first time period and the second time period comprising a first number of logging instances;
bypassing measurements of a plurality of information elements for a second number of logging instances after the second time period when the UE is stationary at the second time period; and
performing the measurements of the plurality of information elements for the second number of logging instances after the second time period when the UE is moving at the second time period.
20. The method of clause 18 or 19, further comprising performing measurements of the plurality of information elements at a first logging instance corresponding to the first time period and each logging instance of the first number of logging instances.
21. The method of any of the clauses 18-20, in which the first number of logging instances is less than or equal to the second number of logging instances.
22. The method of any of the clauses 18 or 20-21, in which determining whether to perform the measurements comprises:
    determining the UE is moving at a first time period during the MDT session;
    determining whether the UE is stationary at a second time period, a time difference between the first time period and the second time period comprising a first number of logging instances;
    performing the measurements of the plurality of measurement types for a second number of logging instances after the second time period when the UE is moving at the second time period.
23. The method of any of the clauses 18-22, further comprising determining the mobility based on positioning sensor measurements.
24. The method of any of the clauses 18-23, further comprising obtaining the positioning sensor measurements at each motion status evaluation period.
25. The method of any of the clauses 18-24, further comprising configuring a subsequent motion status evaluation period after a current motion status evaluation period based on whether the UE is stationary or mobile.
26. A method performed by a base station, comprising:
    transmitting, to a user equipment (UE), a radio resource control (RRC) message comprising a logging measurement configuration including a minimization of drive test (MDT) measurement priority assigned to each of a plurality of measurement types; and
    receiving from the UE, an MDT log generated based on the logging measurement configuration.
27. The method of clause 26, further comprising transmitting the MDT measurement priority in an additional information element.
28. The method of clause 26 or 27, in which the plurality of measurement types include at least one of a serving cell measurement type, a neighbor cell measurement type, a location measurement type, an multimedia broadcast multicast service over single frequency network (MBSFN) measurement type, a wireless local area network (WLAN) measurement type, or a Bluetooth measurement type.
29. The method of any of the clauses 26-28, in which the MDT measurement priority comprises an integer.
30. The method of any of the clauses 26-29, in which the MDT log includes a subset of the plurality of measurement types configured in the logging measurement configuration.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method performed by a user equipment (UE), comprising:
    receiving a logging measurement message comprising a logging measurement configuration from a base station;
    initiating a minimization of drive test (MDT) session in response to receiving the logging measurement message;
    determining a status of a UE component in which the status comprises a thermal level,
    satisfying status criteria when the thermal level is greater than a threshold;
    selecting a set of logged measurement types from a plurality of logged measurement types based on a measurement priority of each logged measurement type when the status satisfies the status criteria in which the measurement priority of each logged measurement type in the set of logged measurement types satisfies a priority criteria;

generating an MDT log at each logging instance of a plurality of logging instances based on measurements collected for the set of logged measurement types when the status satisfies the status criteria; and transmitting, to the base station, the MDT log of each logging instance after completing the MDT session.

2. The method of claim 1, further comprising collecting, at each logging instance, measurements for the set of logged measurement types from the plurality of logged measurement types, in which the plurality of logged measurement types comprise serving cell measurements, neighbor cell measurements, wireless local area network (WLAN) measurements, Bluetooth measurements, location measurements, multimedia broadcast multicast service single frequency network (MBSFN) measurements, and/or implementation specific measurements.

3. The method of claim 1, further comprising setting the priority criteria as a range of highest priority values.

4. The method of claim 3, in which the range is based on the status.

5. The method of claim 1, in which the UE component comprises a battery and the status comprises a battery level, and the method further comprises satisfying the status criteria when the battery level is less than a threshold.

6. The method of claim 1, further comprising receiving a message from an original equipment manufacturer or a network operator indicating the measurement priority for each logged measurement type of the plurality of logged measurement types.

7. The method of claim 1, further comprising determining the measurement priority for each logged measurement type of the plurality of logged measurement types from the logging measurement configuration.

8. The method of claim 1, in which the status comprises a configuration provided by an original equipment manufacturer (OEM) or a network operator.

9. The method of claim 1, in which the plurality of logged measurement types are a subset of logged measurement types configured in the logging measurement configuration.

10. The method of claim 1, further comprising:
filtering the MDT log of each logging instance to remove collected measurements based on a measurement threshold after completing the MDT session; and
transmitting, to the base station, the filtered MDT log of each logging instance.

11. A method performed by a user equipment (UE), comprising:
receiving a logging measurement message comprising a logging measurement configuration from a base station;
initiating a minimization of drive test (MDT) session in response to receiving the logging measurement message;
selecting a plurality of logged measurement types from a plurality of logged measurement types based on a measurement priority of each logged measurement type in which the measurement priority of each logged measurement type in the set of logged measurement types satisfies a priority criteria;
generating an MDT log at each logging instance of a plurality of logging instances based on measurements collected for the plurality of logged measurement types configured by the logging measurement configuration;
filtering the MDT log of each logging instance to remove a logged measurement type based on a measurement threshold after completing the MDT session; and
transmitting, to the base station, the filtered MDT log of each logging instance.

12. The method of claim 11, in which the logged measurement type comprises a signal strength measurement of at least one of a serving cell, a neighbor cell, an inter-radio access technology (IRAT) cell, a multimedia broadcast multicast service over single frequency network (MBSFN) cell, a wireless local area network (WLAN) cell, a Bluetooth cell, or a combination thereof, and the measurement threshold comprises a signal strength/signal quality measurement threshold.

13. The method of claim 11, in which the filtering comprises removing transmit power measurements greater than a transmit power threshold.

14. The method of claim 11, further comprising determining the measurement threshold from the logging measurement configuration.

15. The method of claim 11, further comprising receiving a message from a network operator or an original equipment manufacturer (OEM) indicating the measurement threshold.

16. A method performed by a user equipment (UE), comprising:
receiving a logging measurement message comprising a logging measurement configuration from a base station;
initiating a minimization of drive test (MDT) session in response to receiving the logging measurement message;
determining whether to perform measurements for a plurality of logged measurement types configured by the logging measurement configuration based on a mobility of the UE, wherein the determining comprises:
determining that the UE is moving at a first time period during the MDT session;
determining whether the UE is stationary at a second time period, a time difference between the first time period and the second time period comprising a first number of logging instances; and
performing the measurements of the plurality of measurement types for a second number of logging instances after the second time period when the UE is moving at the second time period;
generating MDT logs based on measurements determined to be performed; and
transmitting, to the base station, the generated MDT logs.

17. The method of claim 16, in which determining whether to perform the measurements comprises:
determining the UE is stationary at a first time period during the MDT session;
determining whether the UE is stationary at a second time period, a time difference between the first time period and the second time period comprising a first number of logging instances;
bypassing measurements of a plurality of information elements for a second number of logging instances after the second time period when the UE is stationary at the second time period; and
performing the measurements of the plurality of information elements for the second number of logging instances after the second time period when the UE is moving at the second time period.

18. The method of claim 17, further comprising performing measurements of the plurality of information elements at a first logging instance corresponding to the first time period and each logging instance of the first number of logging instances.

19. The method of claim 17, in which the first number of logging instances is less than or equal to the second number of logging instances.

20. The method of claim 16, further comprising determining the mobility based on positioning sensor measurements.

21. The method of claim 20, further comprising obtaining the positioning sensor measurements at each motion status evaluation period.

22. The method of claim 21, further comprising configuring a subsequent motion status evaluation period after a current motion status evaluation period based on whether the UE is stationary or mobile.

23. A method performed by a base station, comprising:
  transmitting, to a user equipment (UE), a radio resource control (RRC) message comprising a logging measurement configuration including a minimization of drive test (MDT) measurement priority assigned to each of a plurality of measurement types; and
  receiving from the UE, an MDT log wherein the MDT log was generated based on the logging measurement configuration that includes a logged measurement type and based on that the logged measurement type satisfies a priority criteria.

24. The method of claim 23, further comprising transmitting the MDT measurement priority in an additional information element.

25. The method of claim 23, in which the plurality of measurement types include at least one of a serving cell measurement type, a neighbor cell measurement type, a location measurement type, an multimedia broadcast multicast service over single frequency network (MBSFN) measurement type, a wireless local area network (WLAN) measurement type, or a Bluetooth measurement type.

26. The method of claim 23, in which the MDT measurement priority comprises an integer.

27. The method of claim 23, in which the MDT log includes a subset of the plurality of measurement types configured in the logging measurement configuration.

\* \* \* \* \*